G. W. GRIMES.
Combined Drill and Planter.
No. 199,200. Patented Jan. 15, 1878.
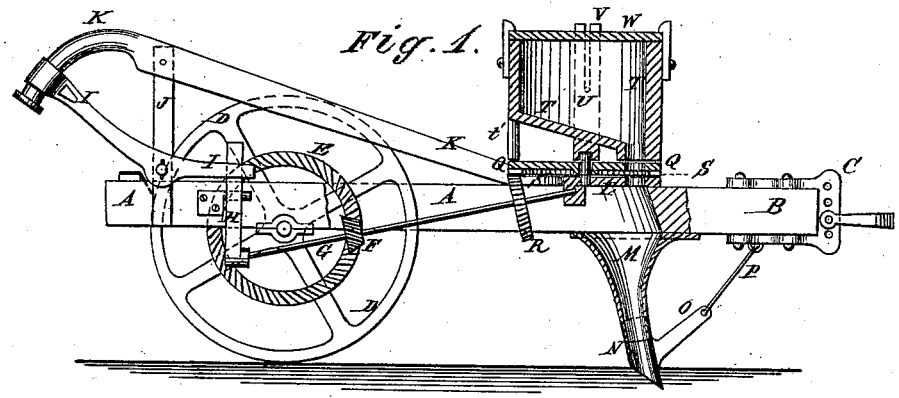
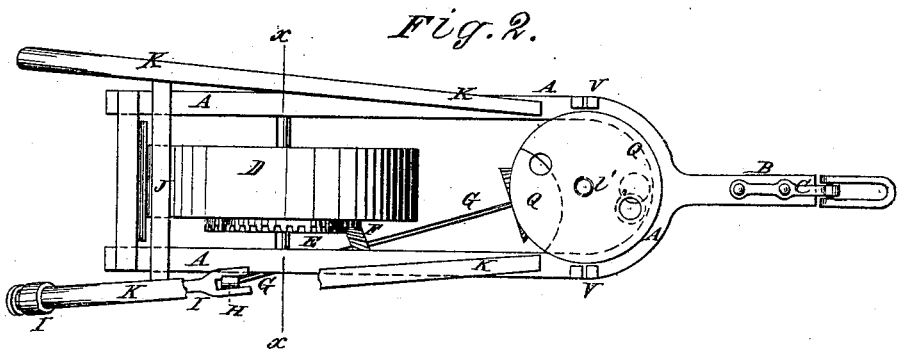
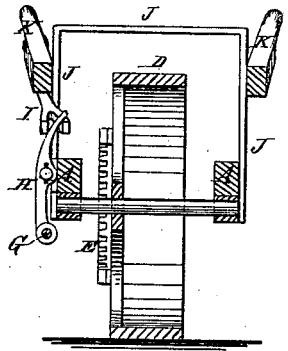
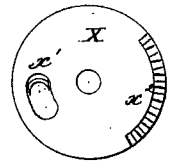
WITNESSES:
H. Rydquist
J. H. Scarborough
INVENTOR:
G. W. Grimes
BY Munn & Co.
ATTORNEYS.

UNITED STATES PATENT OFFICE.

GEORGE W. GRIMES, OF BLUFFTON, INDIANA.

IMPROVEMENT IN COMBINED DRILL AND PLANTER.

Specification forming part of Letters Patent No. 199,200, dated January 15, 1878; application filed October 6, 1877.

*To all whom it may concern:*

Be it known that I, GEORGE WASHINGTON GRIMES, of Bluffton, in the county of Wells and State of Indiana, have invented a new and useful Improvement in Combined Drill and Planter, of which the following is a specification:

Figure 1 is a side view of my improved machine, partly in section to show the construction. Fig. 2 is a top view of the same, the seed-hopper being removed and part being broken away to show the construction. Fig. 3 is a vertical cross-section of the same, taken through the line $x\ x$, Fig. 2. Fig. 4 is a detail top view of the seed-dropping disk for planting. Fig. 5 is a detail under side view of the same. Fig. 6 is an edge view of the same.

Similar letters of reference indicate corresponding parts.

The object of this invention is to furnish an improved machine which shall be so constructed that it may be readily adjusted for planting seeds in drills or hills, as may be desired, and which shall be simple in construction, convenient in use, and reliable in operation, dropping the seeds with uniformity and certainty.

The invention will first be described in connection with the drawing, and then pointed out in the claim.

A is the frame of the machine, to the forward end of which is attached the bar B. To the forward end of the draft-bar B is attached the clevis C, in the bow or bend of which are formed a number of holes to receive the clevis, to which the double-tree is attached, so that the point of draft attachment may be conveniently raised and lowered, as may be desired. In bearings attached to the side bars of the frame A revolve the journals of the drive-wheel D, the rim of which is made wide to adapt it to serve also as a roller for covering the seed. To one side of the wheel D is attached, or upon it is formed, a gear-wheel, E, into the teeth of which mesh the teeth of a small gear-wheel, F, attached to the shaft G. The rear end of the shaft G revolves in bearings in the lower end of the lever H, which is pivoted, at its middle part, to the side bar of the frame A. The upper arm of the lever H curves inward, and passes through a slot in the forward end of the bent lever I, which is pivoted at its bend to the arm of the U-bar J, and has a hole formed in its rear end to receive the end of the handle K, so that by moving the upper end of the lever I forward the rear end of the shaft G will be moved outward, and the wheel F thrown out of gear with the wheel E.

The ends of the U-bar J are attached to the side bars of the frame A, and to the said bar J, at its angles, are attached the handles K. The forward ends of the handles K are attached to the side bars of the frame A.

The forward end of the shaft G revolves in a bearing formed upon the lower side of the plate L, attached to the upper side of the side bars of the frame A.

To the lower side of the side bars of the frame A, and directly beneath the plate L, is attached the upper end of the flaring or funnel-shaped spout M, to the lower end of which is detachably attached the hollow foot N, by which the channel is opened to receive the seed.

Upon the forward side of the foot N is formed a short arm, O, to the end of which is attached the end of a rod, P. The other end of the rod P is attached to the clevis C or the forward part of the draw-bar B.

By this construction the foot N, when worn, can be readily detached and replaced with a new one.

In the forward part of the plate L, at one side of the central line of the machine, is formed a hole for the seed to pass through to the spout M. Upon the center of the plate L is formed a short stud, $l'$, to pass through a hole in the center of the dropping-plate Q, and serve as a pivot to said plate Q. The rear part of the plate L is cut away to allow the teeth of the gear-wheel R, attached to the shaft G, to mesh into the teeth of the gear-wheel S, attached to, or formed upon, the lower side of the dropping-plate Q, so that the said plate may be turned by the advance of the machine.

In the plate Q are formed a number of holes to receive the seed—one or two kernels at a time—carry it to and drop it through the hole in the plate L into the spout M, so that the seed may be planted in drills, and at a distance apart depending upon the number of holes in the said plate Q.

T is the hopper, which is cylindrical in form, and with a forwardly-inclined bottom, having the discharge-hole in its lowest part. The lowest part of the bottom of the hopper T rests upon the dropping-plate Q, and has a rubber or leather block or other suitable cut-off attached to it at the side at which the seed is carried out, to prevent the seed from being broken or injured.

To the highest part of the bottom of the hopper T is attached a foot, $t'$, which rests upon the rear part of the plate Q, as shown in Fig. 1.

The weight of the hopper T is supported and the said hopper is kept from turning by a rod, U, that passes through its sides and through slots in the upper ends of the standards V, attached to, or formed upon, the side edges of the plate L. The hopper T is provided with a cover, W, secured in place by catches or other suitable fastenings attached to the sides of the said hopper.

When the seed is to be planted in hills the plate Q is taken off and replaced by the plate X, the dropping-hole of which is elongated, and is provided with a sliding block, $x^1$, secured in place by a set-screw, so that by adjusting the slide $x^1$ the machine may be made to drop any desired number of kernels for a hill.

Upon the under side of the dropping-plate X is formed a segment, $x^2$, of a gear-wheel, the teeth of which mesh into the teeth of the gear-wheel R. The segment $x^2$ is made of such a length that the wheel R may turn the plate X through such a space as will carry its dropping-hole from the discharge-hole of the hopper T to the discharge-hole through the plate L.

The plate X is carried back by a spring, one end of which is attached to a pin or projection, $x^3$, formed upon or attached to the said plate X, and its other end is attached to the foot $t'$ of the hopper T. To the edge of the plate X is attached, or upon it is formed, a pin or lug, $x^4$, to strike against the standard V, and prevent the said plate from being turned too far back by the spring.

Having thus described my invention, I claim as new and desire to secure by Letters Patent—

The stationary plate L, provided with the slotted uprights V, the hopper T, provided with an inclined bottom, the pivoted plate, provided with one or more holes, and a gear-wheel, in combination with the driving-gearing R G F E D, and with the frame-work A B of the machine, substantially as herein shown and described.

GEORGE WASHINGTON GRIMES.

Witnesses:
    W. H. MERRIMAN,
    A. E. BUCKLEY.